United States Patent Office 3,163,676
Patented Dec. 29, 1964

3,163,676
NITRILE HYDROGENATION MANUFACTURE
OF PRIMARY AMINES
Ralph H. Potts, La Grange, Ill., assignor, by mesne assignments, to Armour and Company, Chicago, Ill., a corporation of Delaware
No Drawing. Filed Aug. 13, 1959, Ser. No. 833,392
13 Claims. (Cl. 260—583)

This invention relates to the continuous production of primary amines and more particularly to a continuous method of catalytically hydrogenating nitriles to produce primary amines.

Many processes have been developed for the catalytic hydrogenation of nitriles to form primary amines. The major problem solved by all of these processes is the production of primary amines to the substantial exclusion of secondary and tertiary amines which are generally concurrently formed in catalytic processes for the hydrogenation of nitriles. This result has heretofore been accomplished by using basic catalysts, such as sodium hydroxide, ammonia, tetraethyl ammonium hydroxide and lower alkyl amines, as secondary amine inhibitors. Reduction of the hydrogenation period was also utilized to increase primary amine formation.

I have now discovered that improved results can be obtained by recycling the finished primary amine product into the hydrogenation zone. Such recycling is accompanied by a reduction in the amount of secondary and tertiary amines formed. This result is surprising as it has long been thought that the amount of secondary and tertiary amines formed in such a process increases as the length of time the primary amine is maintained in the hydrogenation zone increases.

I have now discovered a continuous catalytic hydrogenation process for the conversion of nitriles to amines wherein the nitriles are continuously contacted with hydrogen in the presence of a hydrogenation catalyst and ammonia at a temperature of about 65 to about 180° C. under super-atmospheric pressures while continuously cycling from about 25 to about 200% by weight of the hydrogenation product through a heat exchanger to cool the product and back into the hydrogenation zone.

The nitrile raw materials used in my process are those nitriles produced from fatty acids by known processes, for example, by the process of U.S. Patent 2,808,426. Nitriles which can be used as raw materials in my process include aliphatic and cycloaliphatic nitriles having from about 8 to about 24 carbon atoms in the aliphatic or cycloaliphatic radical. Such nitriles can be prepared from both animal and vegetable fatty acid sources as, for instance, coconut oil, palm oil, lard, tallow, castor oil, olive oil, peanut oil, corn oil, soybean oil, lard oil and various fish oils. Specific acids from which nitriles useful in my process can be prepared include myristic, palmitic, stearic, palmitoleic, oleic, linoleic, lauric, ricinoleic, arachidic, linolinic, eleostearic, licanic, lignoceric, mycomycin, diatretyne 2 and erucic acid. Nitriles from cyclic acids, for instance, abietic, dihydroabietic and dehydroabietic. It is to be noted that diatretyne 2 can also be catalytically hydrogenated without first forming the second nitrile group from the acid. In such a case an amide may form if the acid radical is unesterified, or is otherwise unprotected.

Any of the usual amine hydrogenation catalysts may be utilized in my continuous process. Such catalysts include Raney nickel, platinum, platinum on char, palladium, palladium on char and cobalt oxide. Catalyst supports other than char can also be used in my process.

Generally, operating conditions for chemical processes, such as the instant amination process are determined in accordance with equipment limitations. To determine the optimum reaction conditions for a particular nitrile in a particular piece of hydrogenation equipment, all reaction conditions are held constant except one which is varied until an optimum is established. Other variables are then checked until an optimum process is established. As the reaction conditions vary with the nitrile being hydrogenated, the hydrogenation equipment and the catalyst, it is impossible to enumerate all possible operative conditions. For these reasons, only very general reaction temperatures and pressures can be set out as always operative and higher and lower temperatures and pressures can be utilized in many instances. Similarly, the amount of amine-product to be recycled and the secondary amine content of the recycled mixture can vary widely.

Temperatures of about 50–200° C. are operable, though I prefer to carry out my process at about 80 to about 150° C. with total pressures of about 500 to 1100 p.s.i.g.

Super atmospheric pressures are required for the efficient operation of my process. I prefer to utilize pressures on the order of about 50 to about 1500 p.s.i.g. and more preferably utilize pressures on the order of about 500 to about 1100 p.s.i.g. Generally, as indicated above, the pressure utilized in my process is determined by equipment limitations.

As indicated, I recycle long chain aliphatic primary amines to the hydrogenation zone. Generally, the recycled amine is a portion of the product which has been removed from the hydrogenation zone and cooled. The total secondary and tertiary amine concentration of the recycled product of my process is usually considerably less than about 5%, though the product may contain as high as about 2 or 3% by weight total secondary and tertiary amines.

The amount of amine cooled and recycled is determined by many things, including the melting point of the amine, the viscosity of the cooled amine, the heat conductivity of the amine and the area of the heat exchange surface in the cooling equipment. For instance, if the melting point of the amine is only slightly below the hydrogenation zone temperature, large amounts of recycle must be cooled only a few degrees. Conversely, if the amine melting point is considerably below the hydrogenation zone temperature, a smaller amount of amine may be cooled a greater number of degrees to accomplish the same result. The approximate volume of recycle needed for a particular volume of nitrile conversion can be determined by computing the heat evolved in the hydrogenation reaction, determining the optimum temperature below the hydrogenation zone temperature to which the amine recycle can be cooled, and based on this temperature differential, computing the volume of cooled recycle necessary to substantially equal the exothermic heat of reaction. Thus, in a reactor designed to hydrogenate 18 moles of nitrile, there are, after adsorption of 36 moles of hydrogen, on the order of 1,400,000 B.t.u.'s additional heat in the reaction zone. If recycled primary amine product having a temperature of 130° C. on leaving the reaction zone is cooled to 40° C., it will be necessary, if other heat loss is ignored, to recycle 15,000 lbs./hour of cooled product.

The following examples more fully illustrate my invention, but it is not intended that my invention be limited to the pressures, temperatures, percentages, etc. utilized. Rather, it is intended that all equivalents obvious to those skilled in the art be included within the scope of my process as claimed.

*Example I*

A variety of mixtures of tallow nitriles and recycled product were hydrogenated in a small continuous hydrogenation reactor. The reactor had a diameter of ⅝ inch I.D. and was about 22 inches long. The reactor contained from 180 to 240 grams of a kieselguhr supported cobalt oxide (60%) hydrogenation catalyst (Girdler Co. T–300). In some instances the reactants were preheated. The following table sets out described reaction conditions and product properties:

| Run # | 87C | 88B | 86C | 92 | 96 | 97 | 98 |
|---|---|---|---|---|---|---|---|
| Feed, cc. per hour | 120 | 140 | 140 | 300 | 400 | 500 | 600 |
| Percent Nitrile | 75 | 25 | 50 | 25 | 25 | 25 | 25 |
| Percent Amine | 25 | 75 | 50 | 75 | 75 | 75 | 75 |
| Pressure, p.s.i. | 500 | 500 | 500 | 500 | 500 | 500 | 500 |
| Temp., °F.: | | | | | | | |
| Preheater | 222 | 222 | 225 | | | | |
| Top of cat. chamber | 222 | 222 | 222 | 220 | 240 | 250 | 250 |
| Bottom of cat. chamber | 228 | 228 | 225 | | | | |
| Moles H$_2$/mole feed | 3.5 | 2.5 | 3 | 1.67 | 1.67 | 1.67 | 1.67 |
| Moles NH$_3$/mole feed | 8 | 8 | 8 | 2 | 1.67 | 1.67 | 1.67 |
| Ratio of Nitrile Feed per hr. to cat. vol | 0.500 | 0.195 | 0.195 | 0.417 | 0.559 | 0.694 | 0.833 |
| Percent Amine: | | | | | | | |
| Primary | 98.1 | 100.5 | 96.2 | 98.4 | 99.4 | 98.6 | 96.3 |
| Secondary | 1.7 | 1.7 | 2.8 | 1.7 | 1.9 | 1.5 | 1.4 |
| Tertiary | 1.6 | 1.2 | 1.2 | 0.8 | 1.5 | 1.2 | 1.5 |
| Total | 101.4 | 103.4 | 100.2 | 100.9 | 102.8 | 101.3 | 99.2 |
| Iodine Value | 47.4 | 43.8 | 44.8 | 46.4 | 46.5 | 45.9 | 46.1 |

*Example II*

Coconut nitriles were hydrogenated in the apparatus of Example I under many of the same conditions and excellent results were uniformly achieved.

Now having described by invention, what I claim is:

1. A process for the continuous catalytic hydrogenation of nitriles to form long chain aliphatic primary amines comprising contacting continuously, in a hydrogenation zone containing at least one hydrogenation catalyst and a base, an aliphatic nitrile containing from about 8 to about 24 carbon atoms with hydrogen at temperatures of about 50 to about 200° C. and pressures of about 50 to about 1500 p.s.i.g. until hydrogenation of the nitrile to the long chain aliphatic primary amine is substantially complete; removing said amine from the hydrogenation zone; cooling said amine; and recycling a portion of the cooled amine to the hydrogenation zone; said recycled amine containing no less than about 95% of long chain aliphatic primary amines.

2. A process for the continuous catalytic hydrogenation of nitriles to form long chain aliphatic primary amines comprising contacting continuously, in a hydrogenation zone containing at least one hydrogenation catalyst and ammonia, an aliphatic nitrile containing from about 8 to about 24 carbon atoms with hydrogen at temperatures of about 50 to about 200° C. and pressures of about 50 to about 1500 p.s.i.g. until hydrogenation of the nitrile to the long chain aliphatic primary amine is substantially complete; removing said amine from the hydrogenation zone; cooling said amine; and recycling from about 25 to about 200% of the cooled amine to the hydrogenation zone; said recycled amine containing no less than about 95% of long chain aliphatic primary amines.

3. A process for the continuous hydrogenation of nitriles to form long chain aliphatic primary amines comprising contacting continuously, in a hydrogenation zone containing ammonia and at least one hydrogenation catalyst selected from the group consisting of nickel, platinum, palladium and cobalt oxide hydrogenation catalysts; an aliphatic nitrile containing from about 8 to about 24 carbon atoms with hydrogen at temperatures of about 50 to about 200° C. and pressures of about 50 to about 1500 p.s.i.g. until hydrogenation of the nitrile is substantially complete; cooling the amine; and recycling from about 25 to about 200% of the cooled amine to the hydrogenation zone; said recycled amine containing no less than about 95% of long chain aliphatic primary amines.

4. A process for the catalytic hydrogenation of nitriles to form long chain aliphatic primary amines comprising contacting continuously, in a hydrogenation zone containing ammonia and a hydrogenation catalyst selected from the group consisting of nickel, platinum, palladium and cobalt oxide hydrogenation catalysts, an aliphatic nitrile containing from about 8 to about 24 carbon atoms with hydrogen at temperatures of about 50 to about 200° C. and at pressures of about 50 to about 1500 p.s.i.g. until hydrogenation of the nitrile is substantially complete; removing the amine from the hydrogenation zone; cooling the amine; and recycling a portion of the cooled amine to the hydrogenation zone; said recycled amine containing no less than about 95% of long chain aliphatic primary amines.

5. A process for the catalytic hydrogenation of nitriles to form long chain aliphatic primary amines comprising contacting continuously, in a hydrogenation zone containing ammonia and a hydrogenation catalyst, an aliphatic nitrile containing from about 8 to about 24 carbon atoms with hydrogen at temperatures of from about 50 to about 200° C. and at pressures of from about 50 to about 1500 p.s.i.g. until hydrogenation of the nitrile is substantially complete; removing the amine from the hydrogenation zone; cooling the amine; and recycling a portion of the cooled amine to the hydrogenation zone; said recycled amine containing no less than about 95% of long chain aliphatic primary amines.

6. A process for the catalytic hydrogenation of nitriles to form long chain aliphatic primary amines comprising contacting continuously, in a hydrogenation zone containing ammonia and a hydrogenation catalyst, an aliphatic nitrile containing from about 8 to about 24 carbon atoms with hydrogen at temperatures of from about 80 to about 150° C. and at pressures of from about 500 to about 1100 p.s.i.g. until hydrogenation of the nitrile is substantially complete; removing the amine from the hydrogenation zone; cooling the amine; and recycling from about 25 to about 200% by weight of the cooled amine to the hydrogenation zone; said recycled amine containing no less than about 95% of long chain aliphatic primary amines.

7. The process of claim 6 wherein the hydrogenation catalyst is selected from the group consisting of nickel, platinum, palladium and cobalt oxide hydrogenation catalysts.

8. The process of claim 6 wherein the hydrogenation catalyst is a cobalt oxide hydrogenation catalyst.

9. The process of claim 6 wherein the aliphatic nitrile is a tallow nitrile.

10. The process of claim 6 wherein the aliphatic nitrile is a coconut oil nitrile.

11. The process of claim 6 wherein the aliphatic nitrile is a lard nitrile.

12. The process of claim 6 wherein the aliphatic nitrile is a palm oil nitrile.

13. The process of claim 6 wherein the aliphatic nitrile is a soybean oil nitrile.

References Cited in the file of this patent

UNITED STATES PATENTS

| | | |
|---|---|---|
| 2,408,959 | Stegemeyer | Oct. 8, 1946 |
| 2,449,036 | Grunfeld | Sept. 7, 1948 |
| 2,784,232 | Terry et al. | Mar. 5, 1957 |